United States Patent
Hsu

(10) Patent No.: US 7,469,122 B2
(45) Date of Patent: Dec. 23, 2008

(54) DOCUMENT SIZE DETECTING DEVICE AND METHOD OF DETECTING DOCUMENT SIZE THEREOF

(75) Inventor: Ming-Fu Hsu, Hsinchu (TW)

(73) Assignee: Avision Inc. (TW)

( * ) Notice: Subject to any disclaimer, the term of this patent is extended or adjusted under 35 U.S.C. 154(b) by 427 days.

(21) Appl. No.: 11/274,232

(22) Filed: Nov. 16, 2005

(65) Prior Publication Data

US 2006/0103890 A1    May 18, 2006

(30) Foreign Application Priority Data

Nov. 16, 2004    (TW) .............................. 93135159 A

(51) Int. Cl.
*G03G 15/00* (2006.01)
(52) U.S. Cl. .................. 399/370; 399/371; 399/376
(58) Field of Classification Search .................. 399/370, 399/376, 386, 371; 358/302
See application file for complete search history.

(56) References Cited

U.S. PATENT DOCUMENTS

| | | | | |
|---|---|---|---|---|
| 6,057,937 | A * | 5/2000 | Shimizu et al. | 358/302 |
| 6,621,599 | B1 * | 9/2003 | Newell | 358/474 |
| 2003/0179421 | A1 | 9/2003 | Lee | |

FOREIGN PATENT DOCUMENTS

JP    5-48836    2/1993

* cited by examiner

*Primary Examiner*—Hoang Ngo

(57) ABSTRACT

A document size detecting device including a flatbed, a sensing region, a matrix optical sensing unit and a logic processing unit is provided. The flatbed has a first flatbed edge and a second flatbed edge. A first edge and a second edge of the document are respectively aligned with the first flatbed edge and the second flatbed edge. Part of the sensing region is covered by part of the document. The sensing region is formed on the flatbed according to a sensing ability of the matrix optical sensing unit. The matrix optical sensing unit fetches an image from the sensing region and then outputs an image signal accordingly. The logic processing unit receives the image signal and determines the size of the document according to the image signal.

20 Claims, 6 Drawing Sheets

DOCUMENT SIZE DETECTING DEVICE AND METHOD OF DETECTING DOCUMENT SIZE THEREOF

This application claims the benefit of Taiwan application Serial No. 93135159, filed Nov. 16, 2004, the subject matter of which is incorporated herein by reference.

BACKGROUND OF THE INVENTION

1. Field of the Invention

The invention relates in general to a document size detecting device, and more particularly to a device for automatically detecting document size using a matrix optical sensing unit as a sensor.

2. Description of the Related Art

Electronic products such as scanner, printer, facsimile machine and multi-function machine all need to use a document size detecting device. Therefore, the use of an appropriate document size detecting device is important to the electronic products.

Referring to FIG. 1, a top view of conventional document scanning is shown. In FIG. 1, the scanner at least includes a flatbed 110 and several inter-spaced sensors such as sensors 105, 106 and 107. The flatbed 110 can have standard documents of three different sizes such as A3, A4, and B5 disposed thereon. In FIG. 1, the three types of standard documents are respectively named the standard documents 101, 102 and 103. In order to automatically detect the size of the standard document, normally several infrared sensors such as the sensors 105, 106 and 107 are disposed under the flatbed 110. When the to-be-detected standard document 101 is placed on the flatbed 110, the sensor 105 is covered by the standard document 101, but the sensors 106 and 107 are not covered by the standard document 101, hence the standard document is determined to be the standard document 101. When the standard document 102 is placed on the flatbed 110, the standard document 102 covers the sensors 105 and 106 but not cover the sensor 107, hence the standard document placed on the flatbed 110 is determined to be the standard document 102. By the same token, the document is determined to be the standard document 103 when the standard document covers the sensor 105, the sensor 106 and the sensor 107 at the same time.

An extra sensor needs to be added for the scanner to determine another size. Therefore, the more sizes to be determined, the more scanners need to be installed. Consequently, not only the larger space will be needed, the manufacturing cost will be increased at same time. However, if the document is a non-standard document, the conventional scanners would not be able to determine the size of the non-standard document. Furthermore, the sensors are normally infrared sensors, which are easily interfered with by the surrounding light, severely affecting the determination of the document size by the infrared sensors. In order to reduce the interference coming from the surrounding light, a coding circuit is installed at the emitting end of the sensors and a decoding circuit is installed at the receiving end of the sensors. However, the manufacturing cost is increased accordingly. Besides, when the conventional sensor is used, the resolution level cannot be increased.

SUMMARY OF THE INVENTION

It is therefore the object of the invention to provide a document size detecting device. The device, unlike the conventional scanning device, does not need to install multiple infrared sensors for scanning and determining the size of a standard document, is capable of recognizing the sizes of both standard and non-standard documents, and has a higher resolution level.

According to an object of the invention, a document size detecting device including a flatbed, a sensing region, a matrix optical sensing unit and a logic processing unit is provided. The flatbed has a first flatbed edge and a second flatbed edge. A first side and a second side of the document are respectively aligned with the first flatbed edge and the second flatbed edge. Part of the sensing region is covered by part of the document. The sensing region is formed on the flatbed according to a sensing ability of the matrix optical sensing unit. The matrix optical sensing unit fetches an image from the sensing region and then outputs an image signal accordingly. The logic processing unit receives the image signal and determines the size of the document according to the image signal.

According to another object of the invention, a method for detecting a document size is provided. The method includes the following steps. At first, a document is positioned on the flatbed. The flatbed has a first flatbed edge, a second flatbed edge and a sensing region. The document has a first edge, a second edge, a third edge and a fourth edge. The first edge and the second edge are respectively aligned with the first flatbed edge and the second flatbed edge. Part of the sensing region is covered by part of the document. Next, an image inside the sensing region is captured and then an image signal is obtained accordingly. At last, the size of the document is determined according to the image signal.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
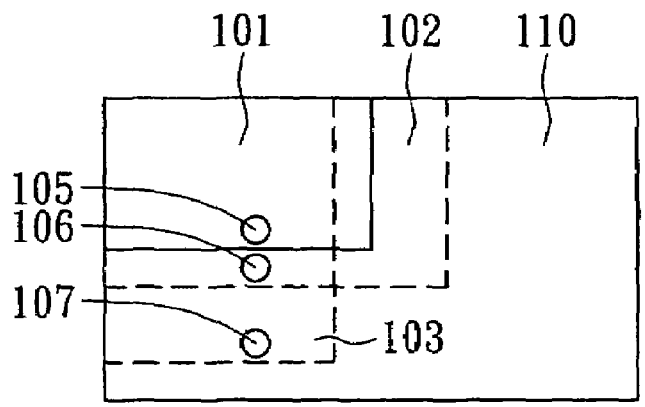
FIG. 1 (Prior Art) is a top view of conventional document scanning.
Figure 2A:
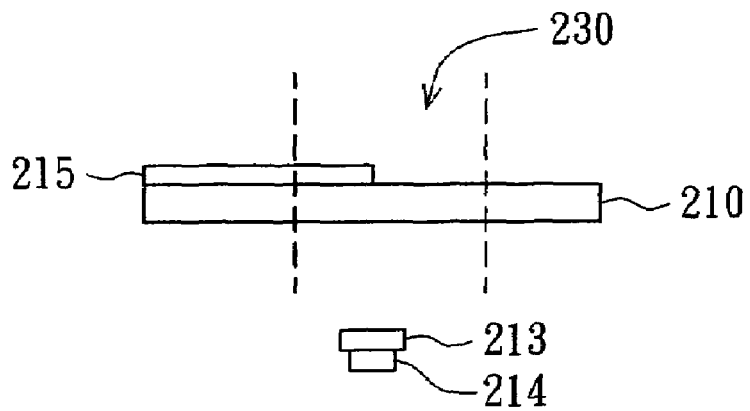
FIG. 2A is a side view of a document size detecting device according to a first embodiment of the invention.
Figure 2B:
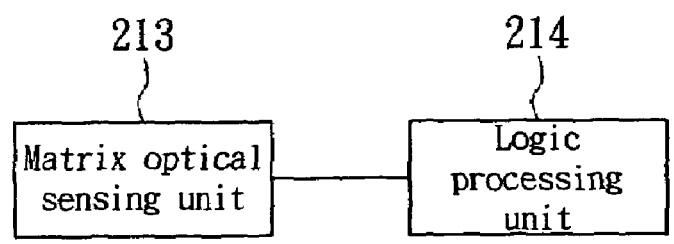
FIG. 2B is a circuit block diagram of a document size detecting device according to the first embodiment of the invention.

Referring to FIGS. 2A-2B, FIG. 2A is a side view of a document size detecting device according to a first embodiment of the invention, while FIG. 2B is a circuit block diagram of the document size detecting device according to the first embodiment of the invention. In FIGS. 2A-2B, The document size detecting device 200 includes a flatbed 210, a sensing region 230, a matrix optical sensing unit 213 and a logic processing unit 214. The matrix optical sensing unit 213 is a complementary metal-oxide semiconductor (CMOS) optical sensor. The logic processing unit 214 and the matrix optical sensing unit 213 can be integrated as an application specific integrated circuit (ASIC). The flatbed 210 is used for at least a document 215 to be placed on. The sensing region 230, which is positioned in the flatbed 210, is formed on the flatbed according to a sensing ability of the matrix optical sensing unit. The matrix optical sensing unit 213 captures an image from the sensing region 230, and then outputs an image signal accordingly. The logic processing unit 214 receives the image signal, and then determines the size of the document 215 accordingly. The matrix optical sensing unit 213 and the document 215 can be positioned to the opposite sides of the flatbed 210 as shown in FIG. 2A. In present embodiment, the document 215 is positioned above the flatbed 210, and the matrix optical sensing unit 213 is positioned under the flatbed 210.

Figure 3A:
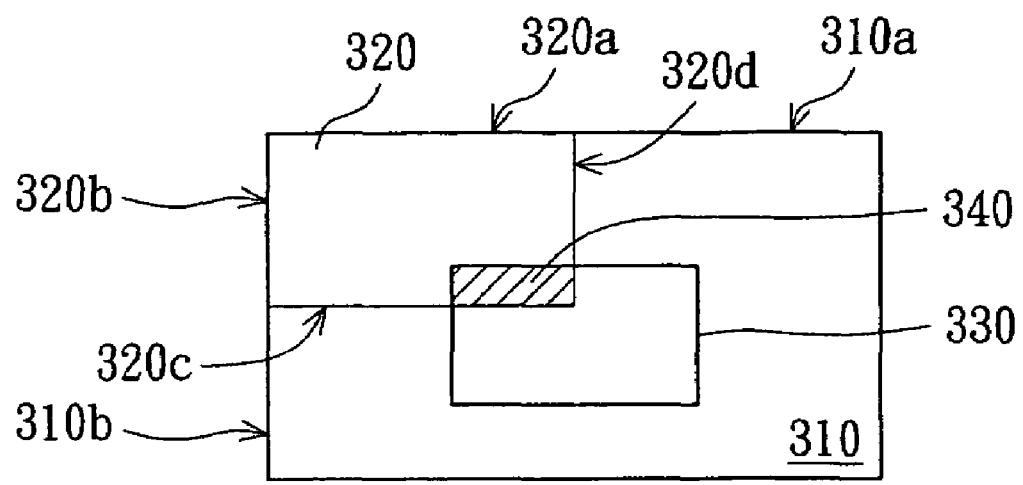
FIG. 3A is a top view when a document is placed on a flatbed
Figure 3B:
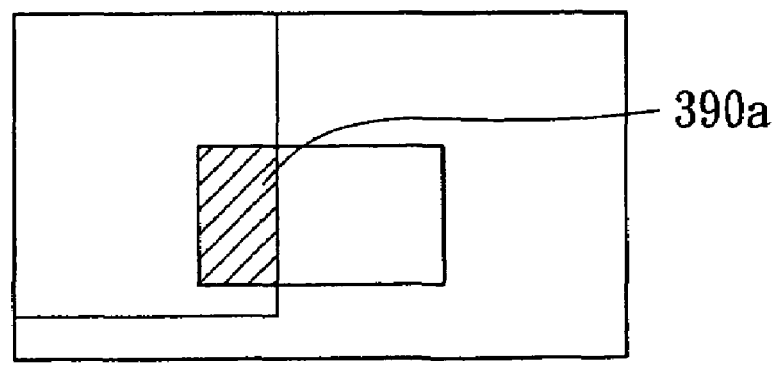
FIG. 3B is a correspondence table I between image shape and area signals and document sizes.
Figure 3C:
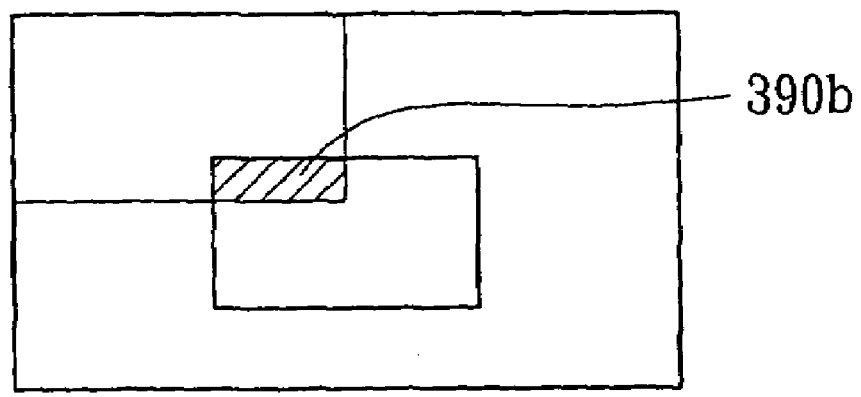
FIG. 3C is correspondence table II between image shape and area signals and document sizes.
Figure 3D:
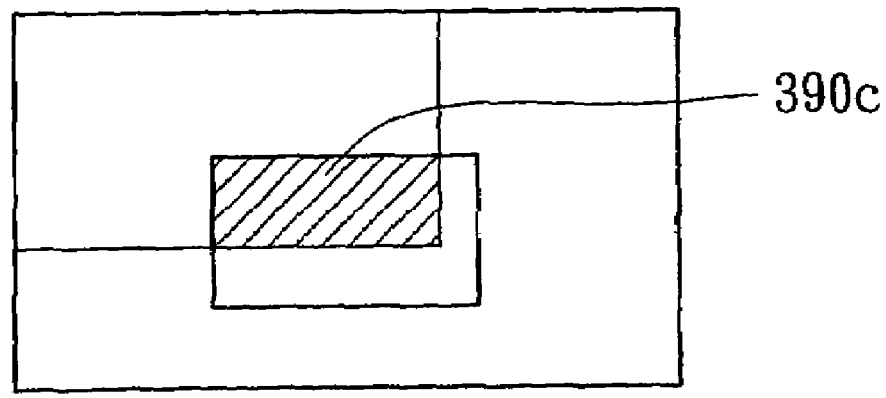
FIG. 3D is correspondence table III between image shape and area signals and document sizes.

Referring to FIG. 3A, a top view when a document is placed on a flatbed is shown. A document 320 is disposed on a flatbed 310. The flatbed 310 had a first flatbed edge 310a and a second flatbed edge 310b. The first flatbed edge 310a is perpendicular to the second flatbed edge 310b. The document 320 can be a standard or un-standard document. The shape of the document 320 can be regular or irregular. The document 320 has a regular peripheral or an irregular peripheral. When the document 320 is positioned in the flatbed 310, part of the peripheral of the document 320 is aligned with the first flatbed edge 310a and the second flatbed edge 310b. In present embodiment, the document 320 has the regular peripheral, such as a quadrangle peripheral. The document 320 has a first edge 320a, a second edge 320b, a third edge 320c and a fourth edge 320d. The first edge 320a and the second edge 320b are aligned with the first flatbed edge 310a and the second flatbed edge 310b, respectively. Part of the third edge 320c and part of the fourth edge 320 are positioned inside the sensing region 330. Part of the sensing region 330 is covered by part of the document 320. Part of the document 320 The matrix optical sensing unit (the labeling number is not illustrated) disposed under the sensing region 330 captures an image inside the sensing region 330 and then outputs an image signal accordingly. The image has a region 340 corresponding to part of the sensing region 330 covered by part of the document 320. The logic processing unit (the labeling number is not illustrated) converts the image signal into an image shape signal or an image shape and area signal (the labeling number is not illustrated). Referring to FIGS. 3A-3D together. FIG. 3B is correspondence table I between image shape and area signals and document sizes. FIG. 3C is correspondence table II between image shape and area signals and document sizes. FIG. 3D is correspondence table III between image shape and area signals and document sizes. After receiving the image signal, the logic processing unit makes comparison according to the shape or the shape and the area of the slanting-line areas illustrated in FIGS. 3B-3D. When the comparison matches each other, the size of the document 320 can be obtained from the correspondence table. For example, in the present embodiment, the logic processing unit determines that the shape or the shape and the area of the slanting-line of the slanting-line area 390a of FIG. 3B is different from that of the region 340 of FIG. 3A. The logic processing unit determines that the shape or the shape and the area of the slanting-line of the slanting-line area 390c of FIG. 3D are different from that of the region 340 of FIG. 3A. The logic processing unit determines that the shape or the shape and the area of the slanting-line of the slanting-line area 390b of FIG. 3C are the same as that of the region 340 of FIG. 3A. Therefore, the size of the document 320 is determined by the logic processing unit to be corresponding to the size of the document stored in FIG. 3C. In the first embodiment, the document 320 can be a standard document such as A4, A5 or B5 format.

Second Embodiment

Figure 4:
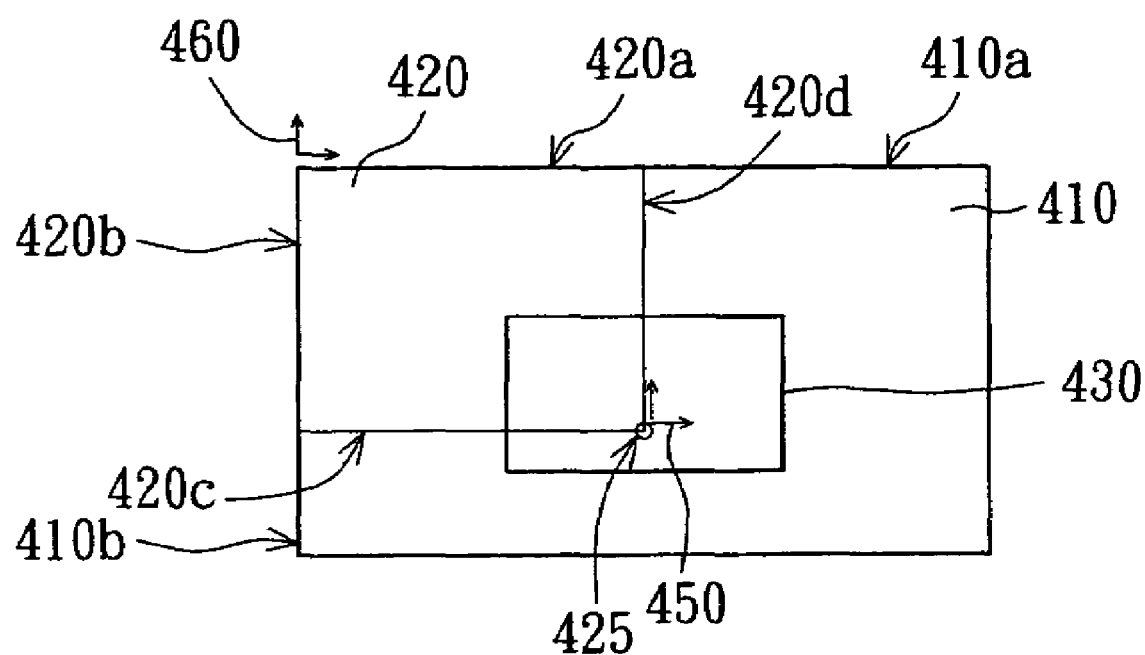
FIG. 4 is a diagram of a document size device coordinate system.

Referring to FIG. 4, a diagram of a document size device coordinate system is shown. A document 420 is disposed on a flatbed 410. The flatbed 410 has a first flatbed edge 410a and a second flatbed edge 410b. The document 420 has a first edge 420a, a second edge 420b, a third edge 420c and a fourth edge 420d. The first edge 420a and the second edge 420b are aligned with the first flatbed edge 410a and the second flatbed edge 410b, respectively. The intersection 425 between the third edge 420c and the fourth edge 420d is positioned inside the sensing region 430. The sensing region 430 has a sensing region coordinate system 450, and the flatbed 410 has a flatbed coordinate system 460. The relationship between the flatbed coordinate system 460 and the sensing region coordinate system 450 is known. During the scanning, the matrix optical sensing unit fetches an image inside the sensing region 430, and then the logic processing unit converts the image signal into an image coordinate signal. The image coordinate signal is the relative coordinate of the intersection 425 between the third edge 420c and the fourth edge 420d with respect to the sensing region coordinate system 450. Since the relationship between the sensing region coordinate system 450 and the flatbed coordinate system 460 is already known, the logic processing unit can calculate the absolute coordinate of the relative coordinate with respect to the flatbed coordinate system 460. After the absolute coordinate is obtained, the length and the width of the document 420 are also calculated. The size of the document is determined. The above judging method is applicable to both standard and the non-standard documents. Furthermore, the CMOS optical sensor is able to capture images of a higher resolution, so that the resolution during scanning can also be increased.

Figure 5A:
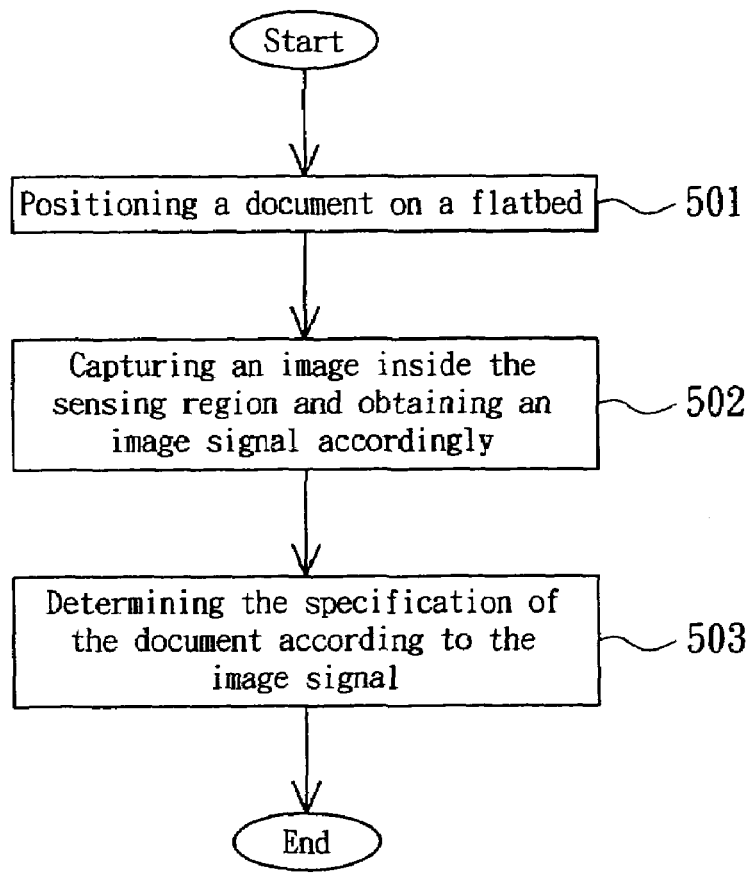
FIG. 5A is a flowchart of the method of detecting the document size.

Referring to FIG. 5A, a flowchart of the method of detecting the document size is shown. At first, the method begins at step 501, a document is positioned on the flatbed 210. Next, proceed to step 502, an image inside the sensing region 230 is captured to obtain an image signal accordingly. At last, proceed to step 503, the size of the document 420 is determined according to the image signal. As for how the present embodiment determines the size of the document 420 according to the image signal is disclosed below with accompanied drawings.

Figure 5B:
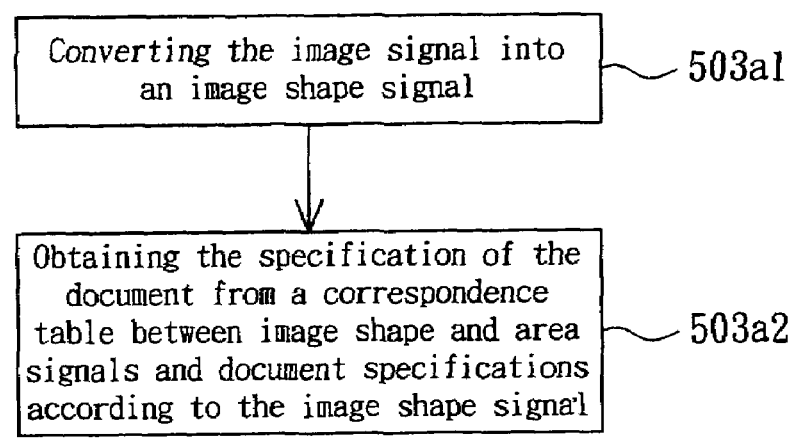
FIG. 5B is a flowchart of the method of determining the document size according to the image shape signal.

The first method of determining the size of the document 420 is shown in FIG. 5B. At first, the method begins at step 503a1, an image signal is converted into an image shape signal. Next, proceed to step 503a2, the size of the document is obtained from the correspondence table between image shape and area signals and document sizes according to the image shape signal.

Figure 5C:
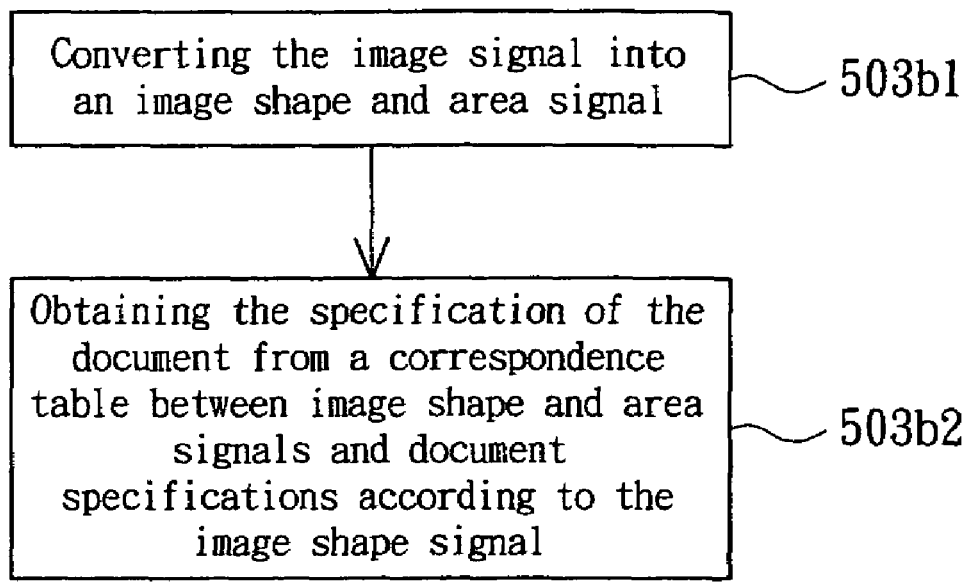
FIG. 5C is a flowchart of the method of determining the document size according to an image shape and a area signal.

The second method of determining the size of the document 420 is shown in FIG. 5C. At first, the method begins at step 503b1, an image signal is converted into an image shape and area signal. Next, proceed to step 503b2, the size of the document is obtained from the correspondence table between image shape and area signals and document sizes according to the image shape and area signal. The method of determining the size of the document 420 according to steps 503a1 and 503a2 or steps 503b1 and 503b2 is also applicable to standard documents such as A3, A4 or A5.

Figure 5D:
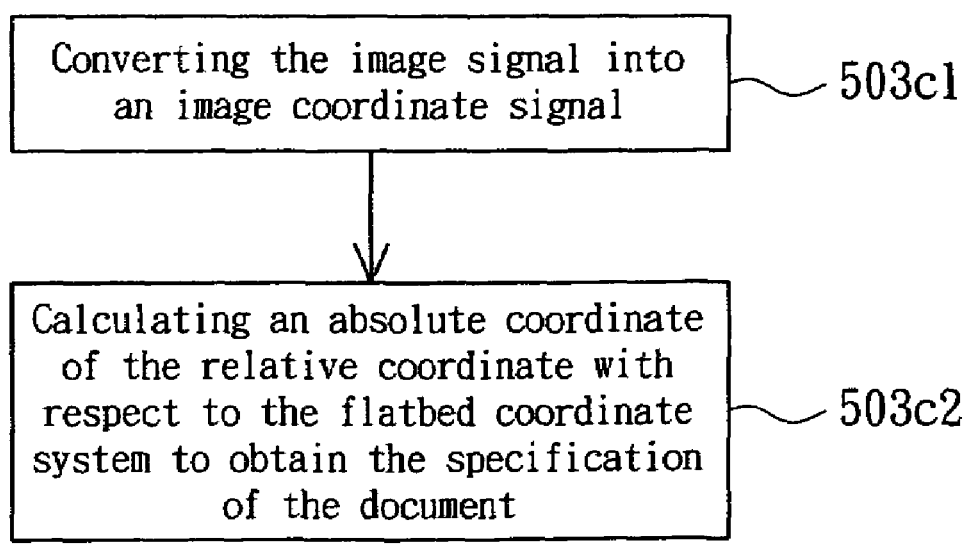
FIG. 5D is flowchart of the method of determining the document size according to the image coordinates.

The third method of determining the size of the document 420 is shown in FIG. 5D. At first, the method begins at step 503c1, an image signal is converted into an image coordinate signal. The image coordinate signal is the intersection 425 between the third edge 420c and the fourth edge 420d with respect to the relative coordinate of the sensing region coordinate system 450. Next, proceed to step 503c2, the absolute coordinate of the relative coordinate with respect to the flatbed coordinate system 460 of the flatbed 410 is calculated to obtain the size of the document 420. The method of determining the size of the document 420 as shown in FIG. 5D is also applicable to non-standard document.

The conventional method of detecting document size requires multiple infrared sensors and can detect standard documents only. The document size detecting device and the method thereof disclosed in above embodiment of the invention not only reduces the manufacturing cost of the conventional practice which employs multiple infrared sensors, but is also capable of detecting both standard and non-standard documents. Furthermore, with the use of a matrix optical sensing unit, the invention increases the resolution level of scanning.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A document size detecting device, comprising:
   a flatbed having a first flatbed edge and a second flatbed edge intersecting with each other, wherein the flatbed is for a document having a first edge and a second edge to be placed thereon, at least one of the first edge and the second edge of the document is aligned with one of the first flatbed edge and the second flatbed edge;
   a sensing region, part of which is covered by only a part of the document, with a remainder of the document not covering the sensing region;
   a matrix optical sensing unit for capturing an image of the part of the document inside the sensing region and outputting an image signal accordingly,
   wherein the sensing region is formed on the flatbed according to a sensing ability of the matrix optical sensing unit; and
   a logic processing unit for receiving the image signal and determining the size of the document according to the image signal and a position relationship between the sensing region and the flatbed.

2. The device according to claim 1, wherein the logic processing unit processes the image signal to obtain an image shape signal, and the image shape signal corresponds to the shape of the part of the sensing region covered by the part of the document.

3. The device according to claim 2, wherein the logic processing unit further comprises a correspondence table between the image shape signal and document sizes, the logic processing unit compares the image shape signal to determine the size of the document according to the correspondence table.

4. The device according to claim 3, wherein the document is a Standard document.

5. The device according to claim 1, wherein the logic processing unit processes the image signal to obtain an image shape and area signal, the image shape and area signal corresponds to the shape and area size of the part of the sensing region covered by the part of the document.

6. The device according to claim 5, wherein the logic processing unit further comprises a correspondence table between the image shape and area signal and document sizes, the logic processing unit compares the image shape and area signal to determine the size of the document according to the correspondence table.

7. The device according to claim 6, wherein the document is a standard document.

8. The device according to claim 1, wherein the flatbed has a flatbed coordinate system, the sensing region has a sensing region coordinate system, and the flatbed coordinate system corresponds to the sensing region coordinate system.

9. The device according to claim 8, wherein the logic processing unit process the image signal to obtain an image coordinate signal, the image coordinate signal is a relative coordinate of the intersection of a third edge and a fourth edge of the document with respect to the sensing region coordinate system, wherein the third edge opposite to the first edge and the fourth edge opposite to the second edge intersect with each other.

10. The device according to claim 9, wherein the logic processing unit calculates an absolute coordinate of the relative coordinate with respect to the flatbed coordinate system to determine the size of the document.

11. The device according to claim 10, wherein the document is a non-standard document.

12. The device according to claim 11, wherein the matrix optical sensing unit and the document are positioned to the opposite sides of the flatbed.

13. The device according to claim 1, wherein the matrix optical sensing unit is a complementary metal-oxide semiconductor (CMOS) optical sensor.

14. The device according to claim 1, wherein the matrix optical sensing unit and the logic processing unit are integrated into an application specific integrated circuit (ASIC).

15. A method of detecting document size, comprising:
   positioning a document on a flatbed, wherein the flatbed has a first flatbed edge, a second flatbed edge and a sensing region, the document has a first edge and the second edge, at least one of the first edge and the second edge is aligned with one of the first flatbed edge and the second flatbed edge, part of the sensing region is covered by only a part of the document, with a remainder of the document not covering the sensing region;
   capturing an image of the part of the document inside the sensing region and obtaining an image signal accordingly; and
   determining the size of the document according to the image signal and a position relationship between the sensing region and the flatbed.

16. The method according to claim 15, wherein the step of determining the size of the document further comprises:

processing the image signal to obtain an image shape signal, wherein the image shape signal corresponds to the shape of the part of the sensing region covered by the part of the document; and obtaining the size of the document from a correspondence table between the image shape and area signal and document sizes according to the image shape signal.

17. The method according to claim 16, wherein the document is a standard document.

18. The method according to claim 16, wherein the step of determining the size of the document further comprises:

processing the image signal to obtain an image shape and area signal, the image shape and area signal corresponds to the shape and the area size of the part of the sensing region covered by the part of the document; and obtaining the size of the document from a correspondence table between the image shape and area signal and document sizes according to the image shape and area signal.

19. The method according to claim 18, wherein the document is a standard document.

20. The method according to claim 16, wherein the flatbed has a flatbed coordinate system, the sensing region has a sensing region coordinate system, the flatbed coordinate system corresponds to the sensing region coordinate system, and in the step of determining the size of the document, the method further comprises:

processing the image signal to obtain an image coordinate signal, the image coordinate signal is a relative coordinate of the intersection of a third edge and a fourth edge of the document with respect to the sensing region coordinate system, wherein the third edge is opposite to the first edge and the fourth edge is opposite to the second edge; and calculating an absolute coordinate of the relative coordinate with respect to the flatbed coordinate system to obtain the size of the document.

* * * * *